(12) United States Patent
Ishikawa et al.

(10) Patent No.: US 6,937,308 B2
(45) Date of Patent: Aug. 30, 2005

(54) IN-PLANE SWITCHING LIQUID CRYSTAL DISPLAY WITH COMPENSATION FILM

(75) Inventors: Tomohiro Ishikawa, Rochester, NY (US); Xiang-Dong Mi, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/205,860

(22) Filed: Jul. 26, 2002

(65) Prior Publication Data

US 2004/0017532 A1 Jan. 29, 2004

(51) Int. Cl.[7] .................................... G02F 1/1335
(52) U.S. Cl. .................. 349/117; 349/119; 349/121; 349/141
(58) Field of Search .................. 349/141, 117–121

(56) References Cited

U.S. PATENT DOCUMENTS

| | | | |
|---|---|---|---|
| 5,504,603 A | * | 4/1996 | Winker et al. .......... 349/117 |
| 5,600,464 A | | 2/1997 | Ohe et al. |
| 5,619,352 A | * | 4/1997 | Koch et al. ............ 349/89 |
| 6,115,095 A | * | 9/2000 | Suzuki et al. ......... 349/141 |
| 6,181,400 B1 | | 1/2001 | Yang et al. |
| 6,184,957 B1 | | 2/2001 | Mori et al. |
| 6,245,398 B1 | | 6/2001 | Matsuoka et al. |
| 6,285,429 B1 | * | 9/2001 | Nishida et al. ........ 349/141 |
| 6,362,032 B1 | | 3/2002 | Kim et al. |
| 6,466,288 B1 | * | 10/2002 | Rho ..................... 349/141 |

OTHER PUBLICATIONS

Martin Schadt, et al., "Photo–Induced Alignment and Patterning of Hybrid Liquid Crystalline Polymer Films on Single Substrates," Japanese Journal of Applied Physics, Part 2, vol. 34, No. 6B, Jun. 15, 1995, pp. L764–767.
A. Lien, "2–D Simulations of In–Plane Switching–Mode LCDs," SID Digest, 1996, pp. 175–178.
Y. Saitoh, et al., "Optically Compensated In–Plane–Switching–Mode TFT–LCD Panel," SID Digest, 1998, pp. 706–709.

* cited by examiner

Primary Examiner—Robert H. Kim
Assistant Examiner—Michael H Caley
(74) Attorney, Agent, or Firm—Arthur E. Kluegel

(57) ABSTRACT

Disclosed is a display comprising an in-plane switching (IPS) mode liquid crystal cell, a polarizer, and a compensation film containing a positively birefringent material with the optic axis tilted in a plane perpendicular to the liquid crystal cell plane. Such displays exhibit an improved viewing angle characteristic.

16 Claims, 19 Drawing Sheets

IN-PLANE SWITCHING LIQUID CRYSTAL DISPLAY WITH COMPENSATION FILM

FIELD OF THE INVENTION

This invention relates to a display comprising an in-plane switching nematic liquid crystal cell, a polarizer, and a particular compensation film.

BACKGROUND OF THE INVENTION

Liquid crystals (LC) are widely used for electronic displays. In these display systems, an LC layer is typically situated between a pair of polarizer layers. Incident light polarized by the first polarizer passes through a liquid crystal cell and is affected by the molecular orientation in the liquid crystal, which can be altered by the application of a voltage across the cell. The altered light goes into the second polarizer. By employing this principle, the transmission of light from an external source, including ambient light, can be controlled. The energy required to achieve this control is generally much less than required for the luminescent materials used in other display types such as cathode ray tubes. Accordingly, LC technology is used for a number of electronic imaging devices, including but not limited to digital watches, calculators, portable computers, electronic games for which light weight, low power consumption and long operating life are important features.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cells, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction.

Liquid crystal displays (LCDs) are quickly replacing CRT (Cathode Ray Tubes) as monitors for desktop computers and other office or house hold equipments. It is also expected that the number of LCD television monitors with a larger screen size will sharply increase in the near future. However, unless problems of viewing angle dependence such as coloration, degradation in contrast, and an inversion of brightness are solved, LCD's application as a replacement of the traditional CRT will be limited.

To correct this problem, several methods have been proposed. One of them is to place phase retardation films between the liquid crystal cell and polarizers of LCDs. The films compensate the phase retardation suffered by a light ray in a liquid crystal cell thus enlarging the viewing angle range with a good image quality. The second method is to utilize a particular construction of liquid crystal cell. For example, in a multi-domain mode, compensation is achieved by appropriately dividing the liquid crystal alignment in each pixel into a multiple of sub-pixels.

In these methods, the electric field is applied perpendicular to the surface of the liquid crystal cell to control the direction of the optic axis (the direction in which light does not see birefringence) of liquid crystal molecules. This means that the brightness variation in conventional LCDs is caused mainly by the change in the liquid crystal optic axis direction in the plane perpendicular to the liquid crystal cell surface. This is the main source of strong viewing angle dependence as rays propagating in various directions suffer different phase retardations.

In U.S. Pat. No. 5,600,464 Ohe et al. discloses a mode in which the electric field is applied in the plane (henceforth called in-plane field) of the liquid crystal cell. This mode is usually referred as an IPS mode as an abbreviation of "In Plane Switching" mode. In the IPS mode liquid crystal display, the liquid crystal optic axis changes its direction while remaining in the plane of the liquid crystal cell. This in return results in good viewing angle characteristic. The viewing angle characteristic (VAC) describes a change in a contrast ratio from different viewing direction. Here the viewing direction is defined as a set of polar viewing $\alpha$ and azimuthal viewing angles $\beta$ as shown in the FIG. 1 with respect to a liquid crystal display 101. The polar viewing angle $\alpha$ is measured from display normal direction 103 and the azimuthal viewing angle $\beta$ spans between an appropriate reference direction 105 in the plane of the display surface 107 and projection 108 of vector 109 onto the display surface 107. Various display image properties, such as contrast ratio, color and brightness are functions of angles $\alpha$ and $\beta$.

There are several possible types of operation in the IPS mode liquid crystal display. Lien et al. (SID Digest 1996, page 175–178) suggested different types in which liquid crystals initially take either homogeneous alignment or 90 degree twisted arrangement. They are explained according to the description referring to FIGS. 2A, 2B, 2C, 3A, 3B, 3C, 4A, 4B and 4C.

FIG. 2A is a top view of the homogeneous type IPS mode liquid crystal cell in the OFF state, a state without an in-plane field. The liquid crystal optic axis 201 orients homogeneously in the direction parallel to the transmission axis of the polarizer 203. The transmission axes 203, 204 of a pair of polarizers are crossed, where "crossed" means transmission axes form angle that is in the range 90±10°. A pair of electrodes 205A, 205B are connected to the voltage source 207 with a switch 209. The switch 209 shown in all figures is a simplified schematic. The switch shown in the figure represents the general switching elements such as thin film transistor (TFT) commonly used to turn on or off a single pixel in active matrix displays. FIGS. 2B and 2C show the ON state, a state with an in-plane field. Depending on the sign of dielectric anisotropy of the liquid crystals, they orient parallel (positive anisotropy, see FIG. 2B) or perpendicular (negative anisotropy, see FIG. 2C) to the in-plane field direction indicated by an arrow 202.

FIGS. 3A, 3B and 3C are side views corresponding to FIGS. 2A, 2B and 2C, respectively. The homogenous type IPS mode liquid crystal display 301 has two glass plates 309A and 309B. The first polarizer 302 is attached to the glass plate 309A and the second polarizer 303 is attached to the plate 309B. FIG. 3A is the OFF state where the liquid crystal optic axis 304 is parallel to the transmission axis of the first polarizer 302. In FIG. 3B, the liquid crystal optic axis 304 orients parallel to the direction of the in-plane field 305 generated between the electrodes 307A and 307B while perpendicular to the direction of the in-plane field 305 in FIG. 3C. The sign of dielectric anisotropy is positive in FIG. 3B and negative in FIG. 3C. Since the liquid crystal optic axis 304 is parallel to the transmission axis of the first polarizer 302 in the OFF state (FIGS. 2A and 3A), the light does not see birefringence and is blocked by the second polarizer 303. Thus the OFF state gives a dark state. While in the ON state (FIGS. 2B, 2C, 3B, and 3C), the optic axis 304 deviates with some angle from its original direction and the incoming light experiences phase retardation. As a result, the out coming light is no longer linearly polarized. Thus some portion of light goes through the second polarizer 303. This corresponds to the bright state. In actual applications, however, the liquid crystal optic axis 304 has non-zero tilt φ with respect to a the liquid crystal cell plane 310 (plane parallel to the surfaces of glass pates such as 309A, 309B) as shown in FIG. 3D for the OFF state. This is a result of the alignment procedure such as by a mechanical rubbing and usually less than 10 degrees. We define the azimuthal direction 311 of liquid crystal optic axis 304 by its projection on to the cell plane 310. So, for the OFF (dark) state, it is the azimuthal direction 311 of liquid crystal optic axis 304 that orients uniformly parallel to the transmission axis of the polarizer 302.

FIG. 4A shows a side view of a twist type IPS mode liquid crystal display in the OFF state. The twist type IPS mode liquid crystal display 411 is formed from the bottom and the top glass plates 401A, 401B and a pair of polarizers 402 and 403. The first polarizer 402 is attached to the glass plate 401A and the second polarizer 403 is put on the glass plate 401B. In this case, the transmission axes of the pair of polarizers 402 and 403 are parallel, where "parallel" means the transmission axes of the pair of polarizers form angle in the range of 0±10°. The liquid crystal optic axis 405 exhibits 90° azimuthal twist. In FIG. 4A, the twist is right handed meaning that the liquid crystal optic axis 405 rotates counter clockwise as one follows the direction of increasing thickness indicated by an arrow 407. If it rotates clockwise in the thickness direction, it is called left handed twist. Upon the application of an in-plane field between two electrodes 413A, 413B, unwinding of the twist occurs. FIGS. 4B and 4C show states of liquid crystal schematically in the ON state with the in-plane field for positive and negative dielectric anisotropy, respectively. In the OFF state (FIG. 4A), the incoming light polarized in the direction of the transmission axis of the first polarizer 402 is rotated 90° and absorbed by the second polarizer 403. This gives a dark state. Whereas the On state, corresponding to FIGS. 4B and 4C, is a bright state as the light is no longer linearly polarized upon entering into the second polarizer 403 due to the unwinding of the twist configuration of the liquid crystal optic axis 405. Usually, the optic axis 405 has non-zero tilt φ with respect to the liquid crystal cell plane 441 (here it is parallel to the surfaces of the glass plates 401A, 401B). The azimuthal direction 406 of liquid crystal optic axis 405 is defined by taking the projection of optic axis 405 on the liquid crystal cell plane 441.

Several attempts have been made to improve the VAC of the IPS mode liquid crystal displays using phase retardation films. FIGS. 5A, 5B, 5C and 5D show various types of phase retardation film represented by index ellipsoids. In FIG. 5A, the direction of optic axis 503 lies in the plane 501. The corresponding index of refraction is extraordinary index $n_e$. The other refractive index is ordinary index $n_o$. If $n_e > n_o$, it is called positive A-film, or negative A-film, otherwise. FIG. 5A shows a positive case. When the optic axis 505 is perpendicular to the plane 501 such as shown in FIG. 5B, the film is usually called as a C-film. It is positive if $n_e > n_o$, negative, otherwise. The example in FIG. 5B is positive. The A-film and C-film are uniaxial films as there are two different indices of refraction, ordinary $n_o$ and extraordinary $n_e$. In uniaxial media, one can thus use their optic axes to describe the films' crystallographic orientation. There are also biaxial cases such that all of three principal indices of refraction $n_{x0}$, $n_{y0}$ and $n_{z0}$ are different as shown in FIG. 5C. The slow axis lies in the direction of largest index of refraction. In the example shown in FIG. 5C, the largest index is $n_{z0}$, thus the slow axis 509 is perpendicular to the film plane 501. In general, the slow axis 511 can point anywhere with respect to the film plane 501 as shown in FIG. 5D. In biaxial media, the optic axis is not necessarily parallel to the slow axis. However, we will use slow axis to describe the orientation of biaxial media in the following.

U.S. Pat. No. 6,184,957 discloses the use of film with negative birefringence ($n_e < n_o$) for the IPS mode liquid crystal display. When combined with the IPS mode liquid crystal cell, the method prevents inversion of gradation and coloration in particular viewing angles. FIG. 6A shows an application of this method to the twist type IPS mode liquid crystal display 631. A twist type IPS mode liquid crystal cell 601 is sandwiched by a polarizer 603 and a film 605. Another polarizer 607 is placed on top of the film 605. The film 605 in this case consists of a negatively birefringent material and its optic axis exhibits azimuthal twist of 90° in the plane parallel to the film surface (twist-structured film). The sense of twist in the film 605 in this example is chosen to be opposite to that of the liquid crystal cell. The transmission axes 609, 611 of the pair of polarizers are crossed in this case. The VAC of the display in FIG. 6A is shown in FIG. 6B. Circles 621, 623 and 625 indicate the contrast ratio 400, 800 and 1200, respectively. The line 627 traces the change in the contrast ratio for azimuthal viewing angle 0°≦β<360° at a polar viewing angle α=30°. The compensation method shows some improvement compared to un-compensated case but contrast ratio drops when β is around 45°, 135°, 225°, or 315°.

In another attempt to optically compensate the IPS mode liquid crystal display, Saitoh et al. (SID digest 1998 page 706–709) proposed improvement on the homogeneous type IPS mode liquid crystal display. This was accomplished by placing a phase retardation film between the homogeneous type IPS mode liquid crystal cell and the polarizer. The homogenous type IPS mode liquid crystal display 717 is shown in FIG. 7A. A single biaxial compensation film 701 was used in combination with the homogeneous type IPS mode liquid crystal cell 703 and a pair of polarizers 705 and 707. The direction of slow axis 709 of the biaxial compensation film 701 is parallel to the direction of transmission axis 711 of the polarizer 705 and the azimuthal direction of liquid crystal optic axis 713 of the homogeneous type IPS mode liquid crystal cell 703 in the OFF state. The transmission axis 711 of the other polarizer 705 is perpendicular to the transmission axis 715 of the other polarizer 707. The configuration reduces the light leakage in OFF state and thereby increases the contrast ratio. However, this method has a severe limitation in cases with non-zero tilt angle φ as it is the case in FIG. 3D. As mentioned above, the liquid crystal optic axis 304 has non-zero tilt angle φ with respect to the liquid crystal cell plane 310 as a result of the alignment procedure in actual applications. This leads to a light leakage in the OFF state and results in degraded contrast ratio. FIGS. 7B and 7C are polar plots of a contrast ratio between the OFF and the ON state for φ=2° and φ=4°, respectively. The changes in a contrast ratio 721, 731 (here, contrast ratios, 300, 600 and 900 correspond to concentric circles, 723, 725 and 727, respectively) are plotted against the range of the azimuthal viewing angle 0°≦β<360° for the polar viewing angle α=30°. They demonstrate the degradation in contrast ratio in a wide range of azimuthal viewing angle β caused by the increase in the tilt angle φ of the liquid crystal optic axis. For example, the contrast ratio reduces to less than 300 in φ=4° tilt case (FIG. 7C) from 550 in φ=2° tilt (FIG. 7B) at β=150° and 330°.

The above-mentioned IPS modes and compensation methods have improved the VAC of liquid crystal displays to some extent. After careful examination, however, inventors realized that the prior art IPS mode liquid crystal displays have not attained satisfying viewing quality. This is mainly because of the degradation in contrast ratio in high viewing angle. It is partly attributed to the light leakage in the OFF state caused by the non-negligible tilt angle φ at which the liquid crystal optic axis is aligned with respect to the liquid crystal cell plane. Also, a light leakage from crossed polarizers lowers the viewing quality.

It is a problem to be solved to improve the VAC of an IPS nematic liquid crystal display.

SUMMARY OF THE INVENTION

The invention provides a display comprising an in-plane switching (IPS) mode liquid crystal cell, a polarizer, and a compensation film, the compensation film containing a positively birefringent material oriented with its optic axis tilted in a plane perpendicular to the liquid crystal cell plane and a method of imaging therewith. Such displays exhibit an improved viewing angle characteristic (VAC).

BRIEF DESCRIPTION OF THE DRAWINGS

In FIG. 2B, the dielectric anisotropy of liquid crystal is positive whereas it is negative in FIG. 2C.

In FIG. 4B, the dielectric anisotropy of the liquid crystal is positive, whereas it is negative in FIG. 4C.

FIGS. 5A and 5B show an A-film and a C-film, respectively. FIGS. 5C and 5D show biaxial films. The slow axis is normal to the plane in FIG. 5C and it points in a general direction in FIG. 5D.

DETAILED DESCRIPTION OF THE INVENTION

Reference will now be made to the drawings in which the various elements of the present invention will be given numerical designations and in which the invention will be discussed so as to enable one skilled in the aft to make and use the invention.

Figure 1:
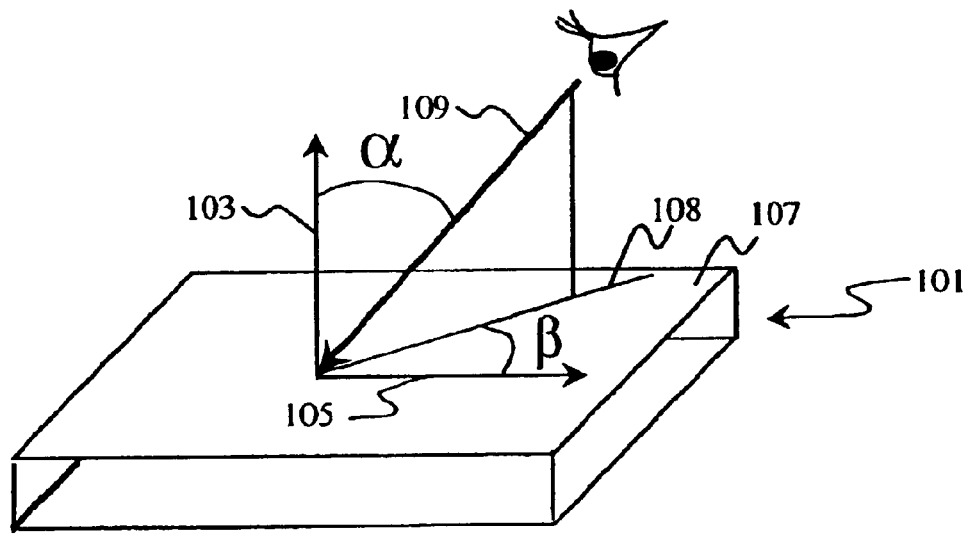
FIG. 1 shows the definition of viewing angles of a display.
Figure 2A:
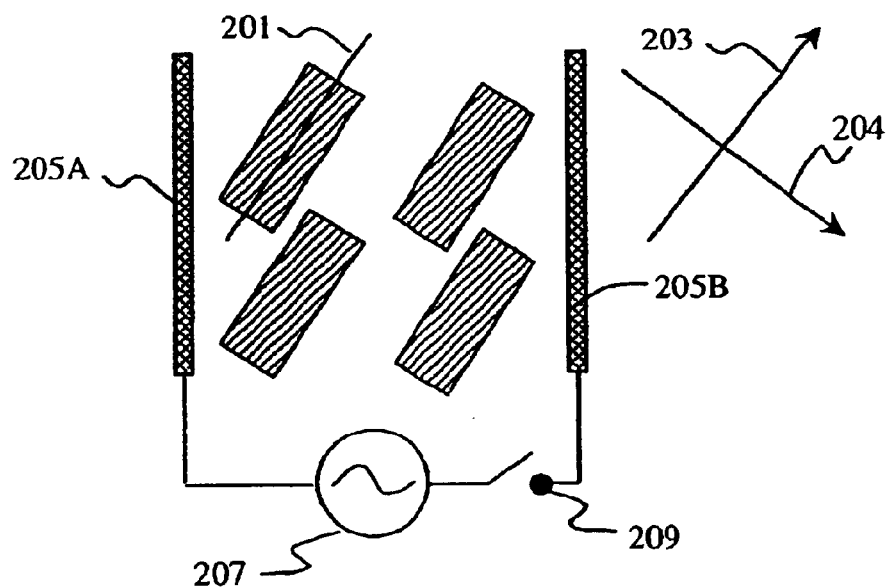
FIG. 2A is a top view of the homogeneous type IPS mode liquid crystal display in the OFF state.
Figure 2B:
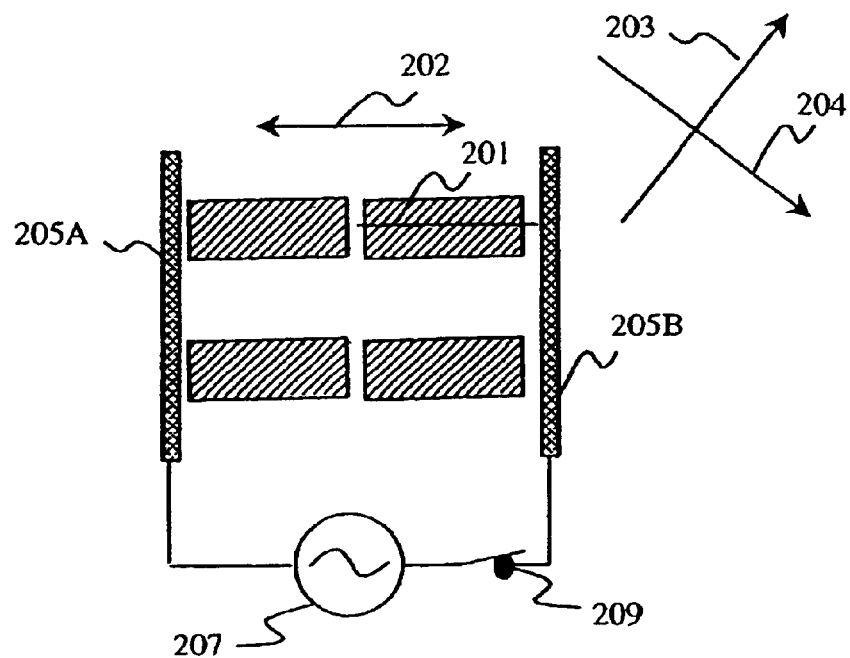
FIGS. 2B and 2C are those of the ON state.
Figure 2C:
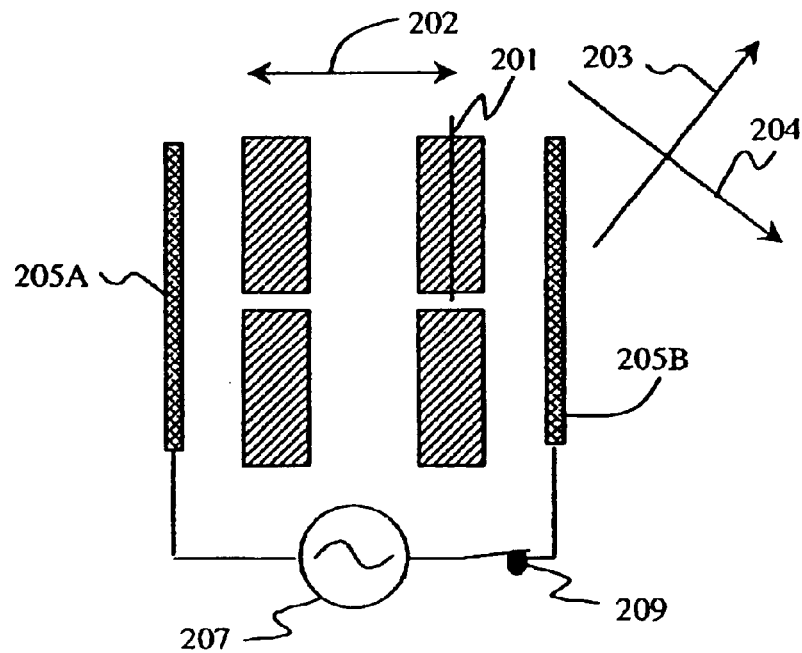
Figure 3A:
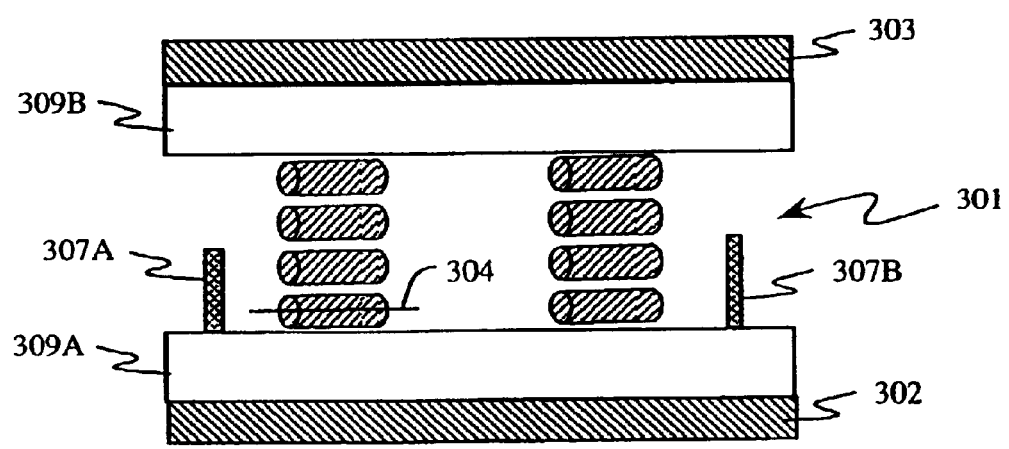
FIGS. 3A, 3B and 3C are side views of the homogeneous type IPS mode liquid crystal display corresponding to FIGS. 2A, 2B and 2C, respectively.
Figure 3B:
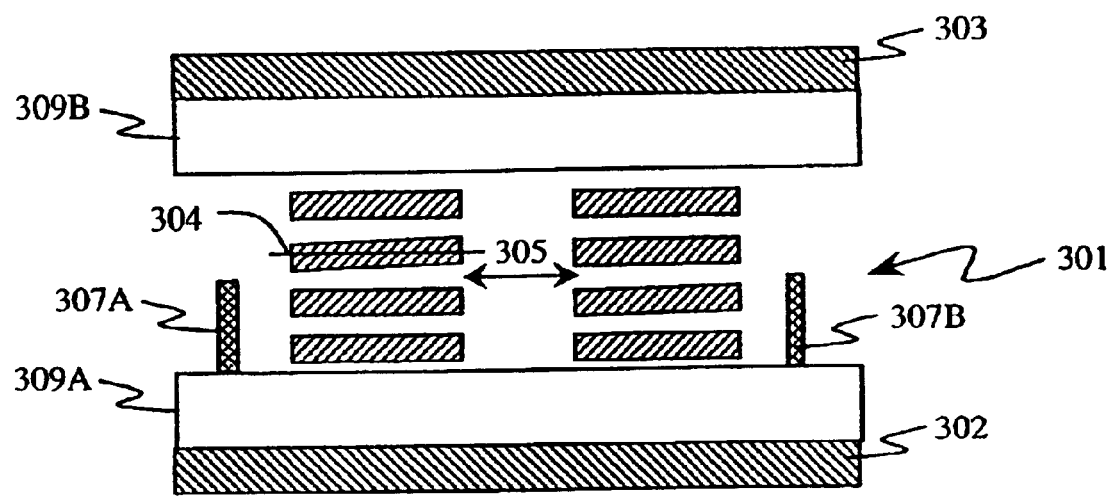
Figure 3C:
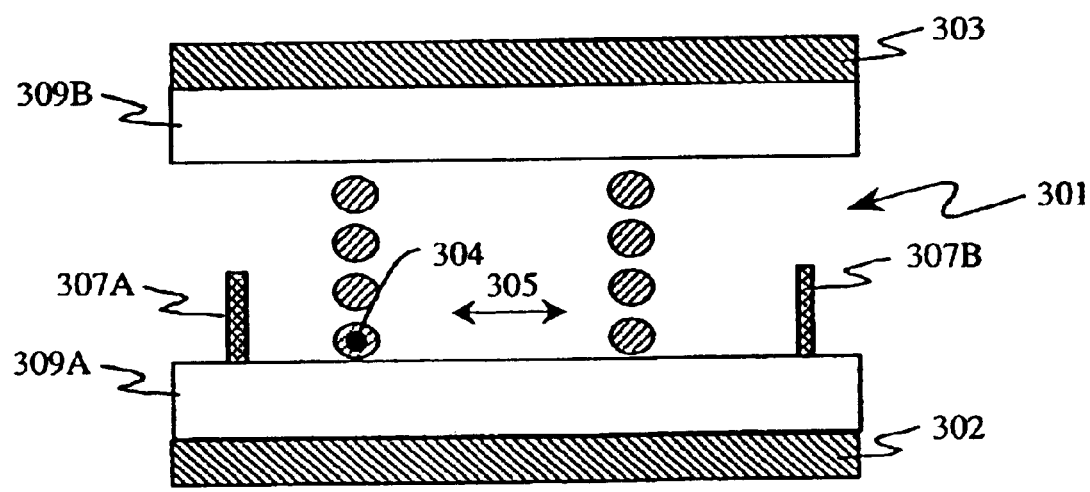
Figure 3D:
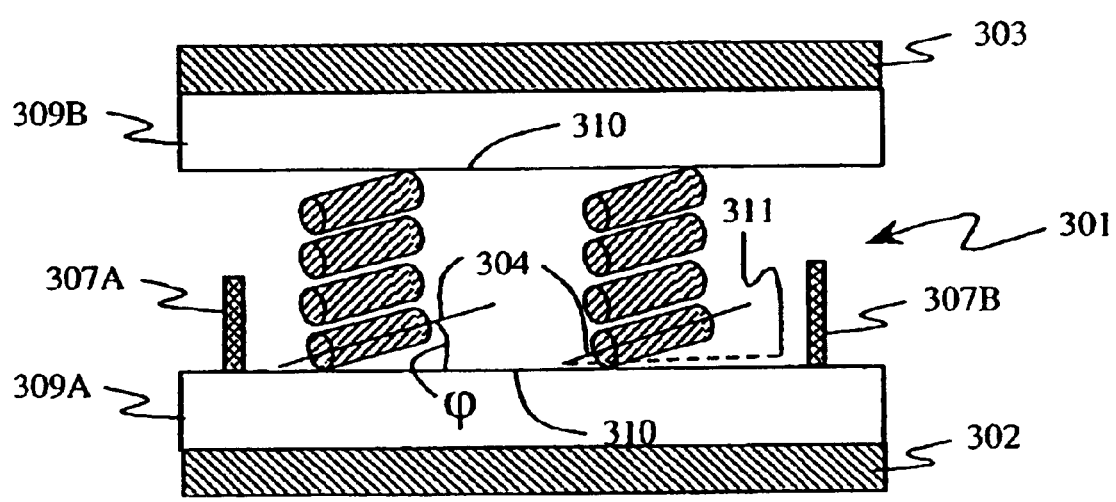
FIG. 3D shows the OFF state corresponds to FIG. 3A with non-zero tilt of liquid crystal optic axis.
Figure 4A:
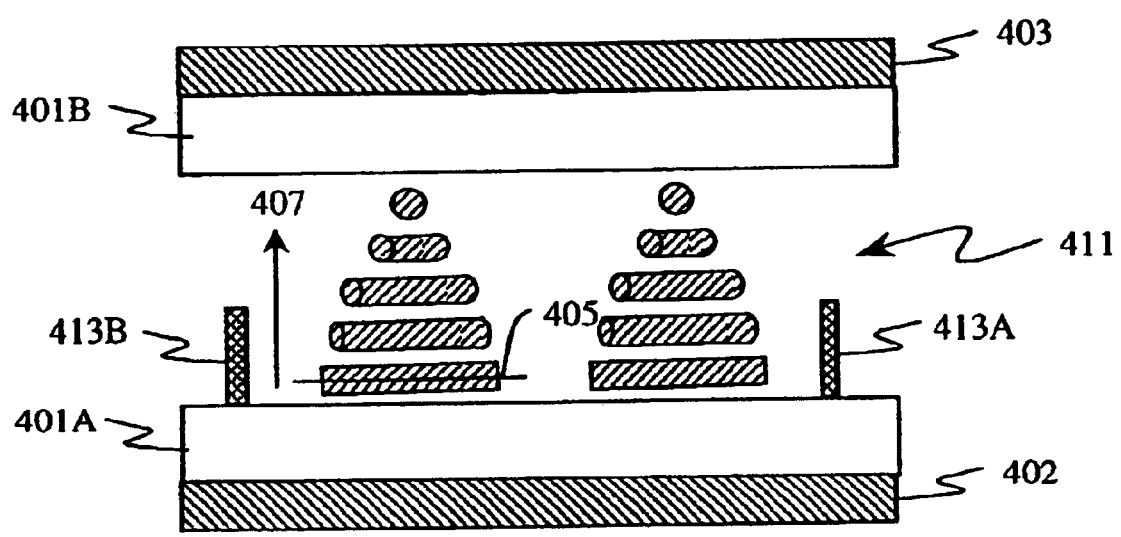
FIG. 4A is a side view of the twist type IPS mode liquid crystal display in the OFF state.
Figure 4B:
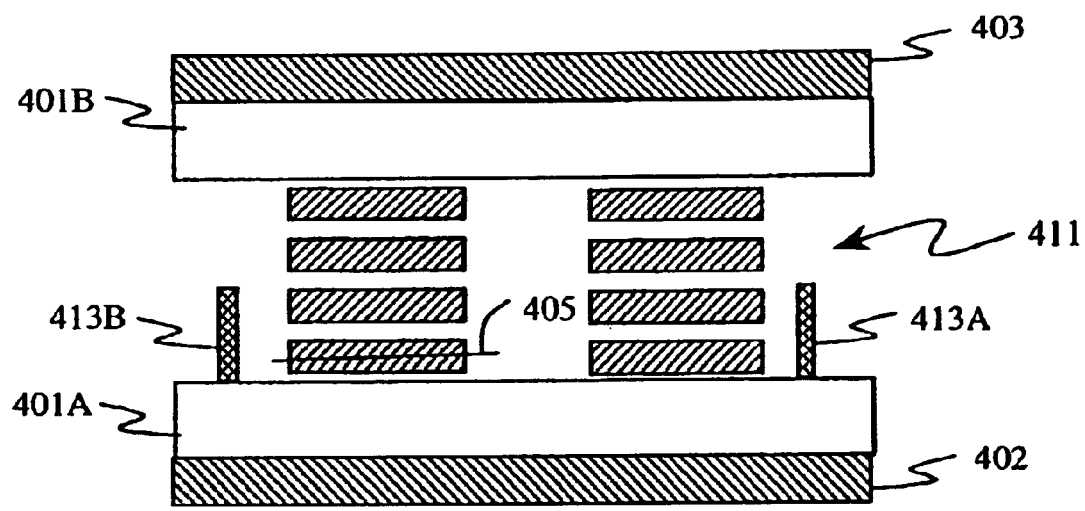
FIGS. 4B and 4C are those of ON state.
Figure 4C:
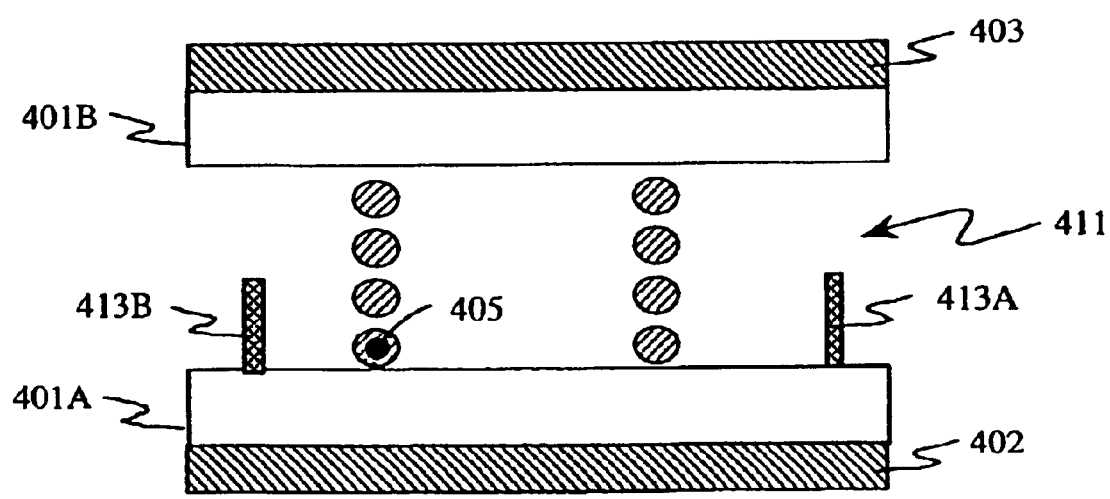
Figure 4D:
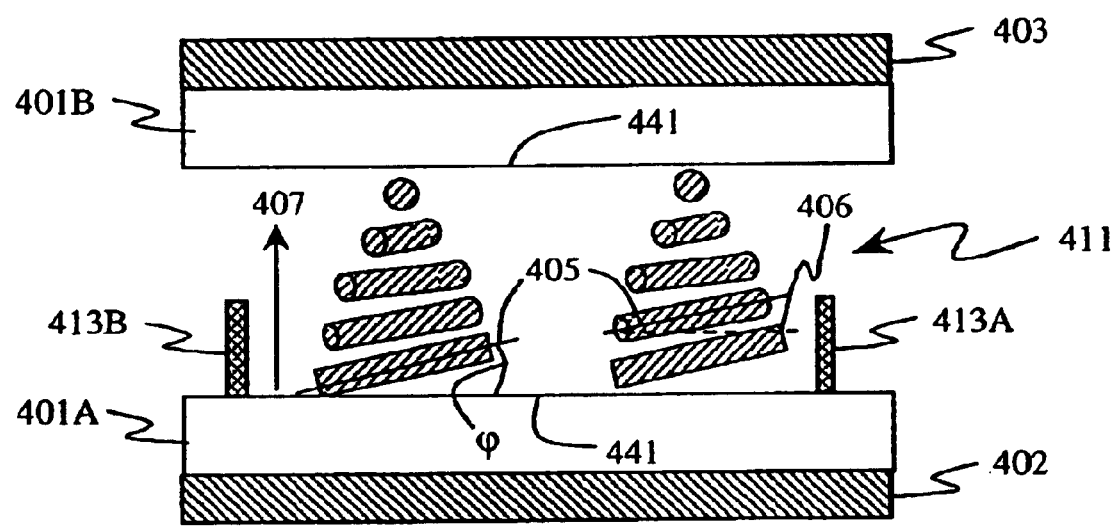
FIG. 4D shows the OFF states corresponds to FIG. 4A with non-zero tilt of liquid crystal optic axis.
Figure 7A:
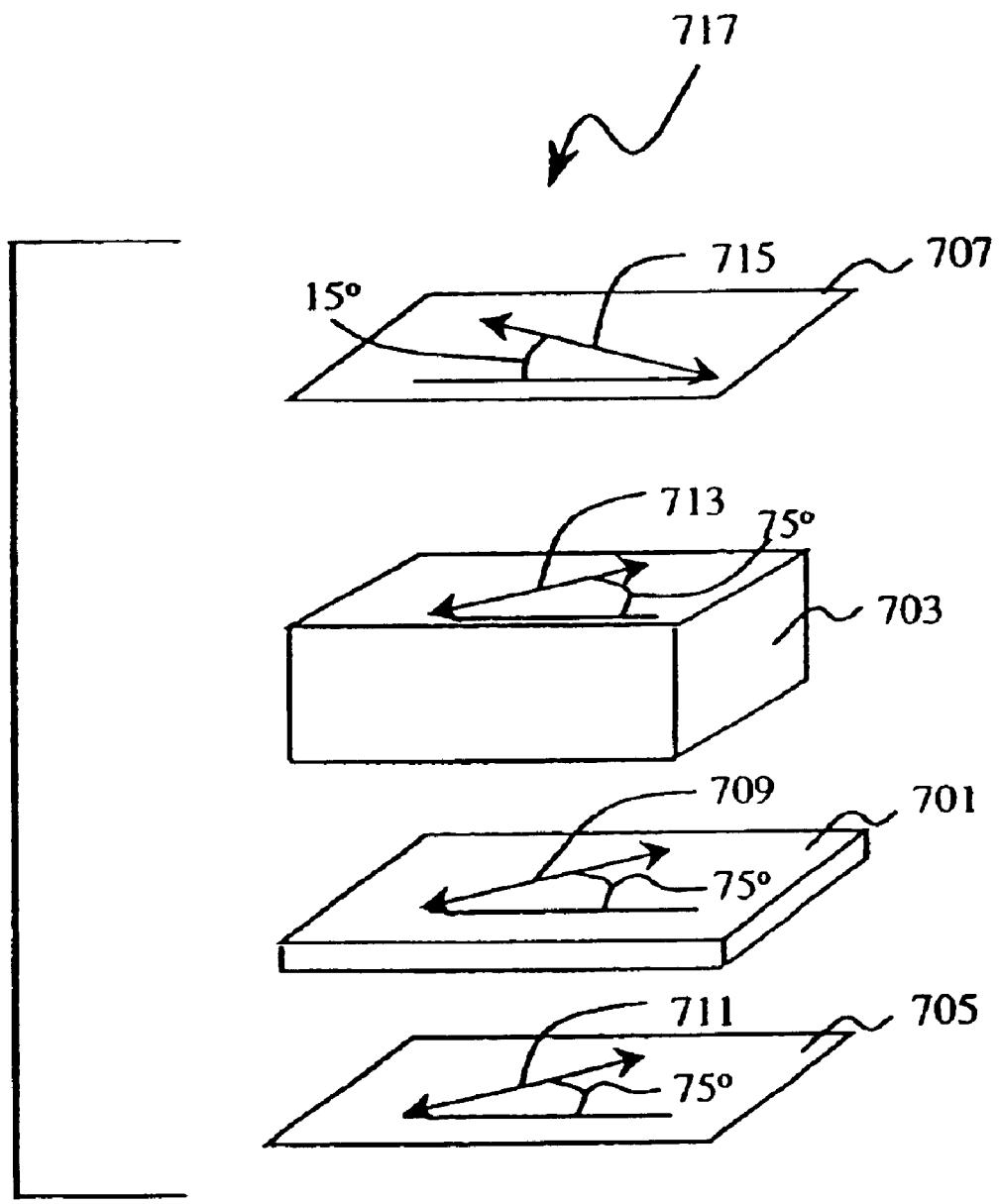
FIG. 7A is a prior art display configuration with a homogeneous type IPS mode liquid crystal cell.
Figure 7B:
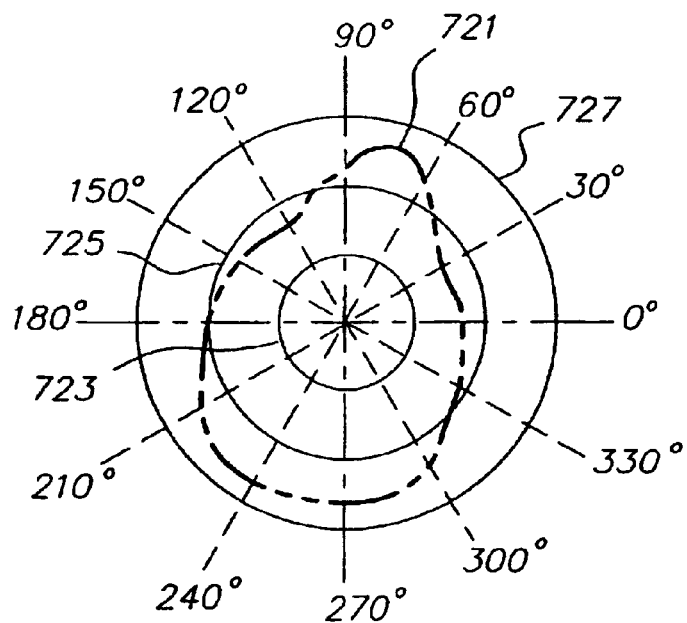
FIGS. 7B and 7C are plots of the contrast ratio against azimuthal viewing angle β at polar viewing angle α=30°. The tilt angles of the liquid crystal optic axis φ are 2° and 4° for FIG. 7B and FIG. 7C, respectively.

FIGS. 2A, 2B and 2C show the mode of operation of the homogeneous type IPS mode liquid crystal display. In the OFF state as shown in FIG. 2A, the liquid crystal optic axis 201 is parallel to the transmission axis of the first polarizer 203. In the ON state shown in FIGS. 2B and 2C, the liquid crystal optic axis 201 deviates from the direction of the polarizer transmission axis 203. FIGS. 3A, 3B and 3C are cross sectional views that correspond to FIGS. 2A, 2B and 2C, respectively. In the OFF state, the light coming through the first polarizer 302 would not see the birefringence thus is absorbed by the second polarizer 303. Thus the OFF state gives a dark state. In the ON state, on the other hand, light experiences birefringence of the liquid crystal as the liquid crystal optic axis 304 deviates from the direction of transmission axis of the first polarizer 302. When it reaches the second polarizer 303, it is no longer linearly polarized in the direction perpendicular to the transmission axis of the second polarizer and this results in the bright state. One of the keys to attain the high contrast ratio is to prevent a light leakage in the OFF state Since the optic axis lies on the transmission axis on the polarizer 302 in the OFF state, one can reduce the light leakage by compensating the crossed polarizers. This method, shown in FIG. 7A, demonstrates some improvement in VAC. According to this method, a biaxial compensation film 701 is placed between the homogeneous type IPS mode liquid crystal cell 703 and polarizer 705. Transmission axes 711,715 of the pair of polarizers 705, 717 are crossed. The slow axis 709 of the biaxial compensation film 701 is parallel to the azimuthal direction of the liquid crystal optic axis 713 of the IPS mode liquid crystal cell 703 (taken, in this case, 75° from the horizontal direction) and the transmission axis 711 of the polarizer 705. However, it fails to block the light in the OFF state when there is a non-zero tilt angle φ of the optic axis 304 with respect to the liquid crystal cell plane 310 as it is the case in FIG. 3D. Because of the light leakage, it is not possible to attain high contrast ratio at all azimuthal viewing angles β without proper compensation methods. As an example, comparisons are made in FIGS. 7B and 7C in viewing angle characteristic (VAC) in terms of azimuthal viewing angle dependence of contrast ratio for tilt angles φ=2° and φ=4°, respectively. The contrast ratio was taken for polar viewing angle α at 30°. Line 721 is a polar plot of a contrast ratio for tilt φ=2°. As FIG. 7C demonstrates, increasing in the tilt φ to 4° leads to a decrease in the contrast ratio, as shown by the line 731. In the current invention, the VAC of homogeneous type IPS mode liquid crystal display is significantly improved by combining the display with the compensation film where the optic axis of the film is tilted in the plane perpendicular to the cell surface.

Figure 5A:
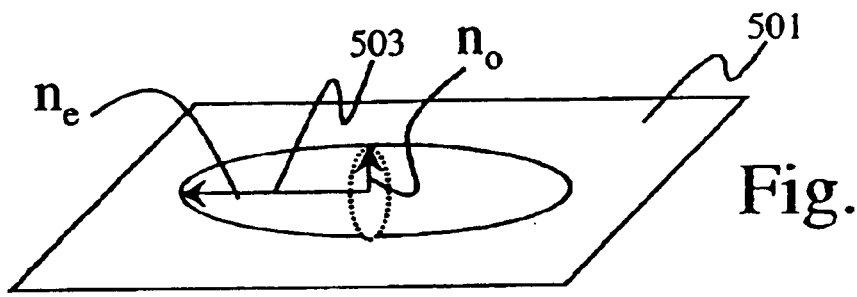
FIGS. 5A, 5B, 5C and 5D show the index ellipsoids for various phase retardation films with respect to the film plane.
Figure 5B:
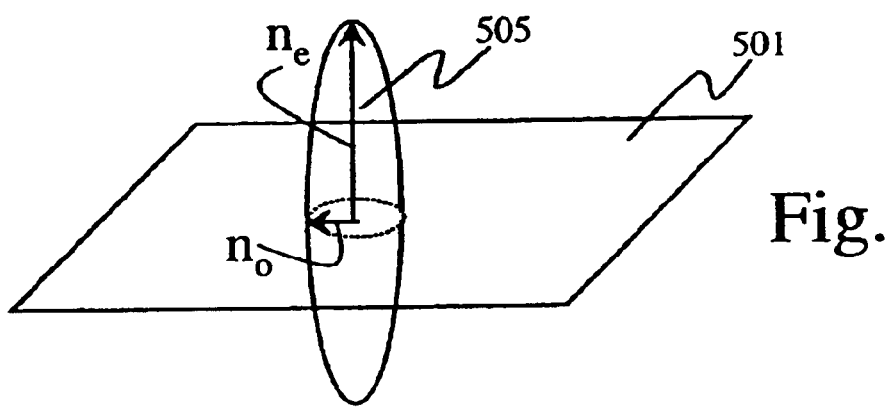
Figure 5C:
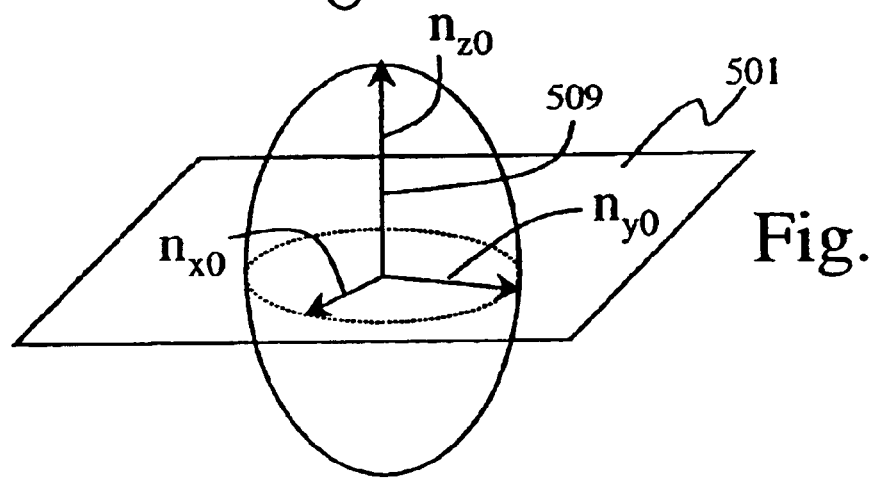
Figure 5D:
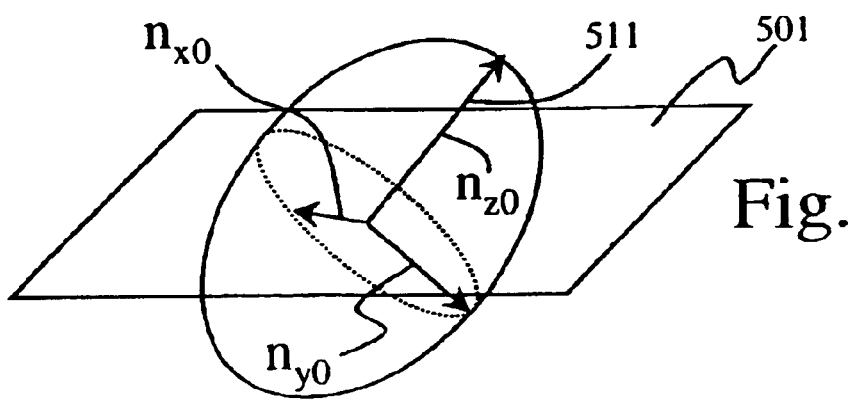
Figure 8A:
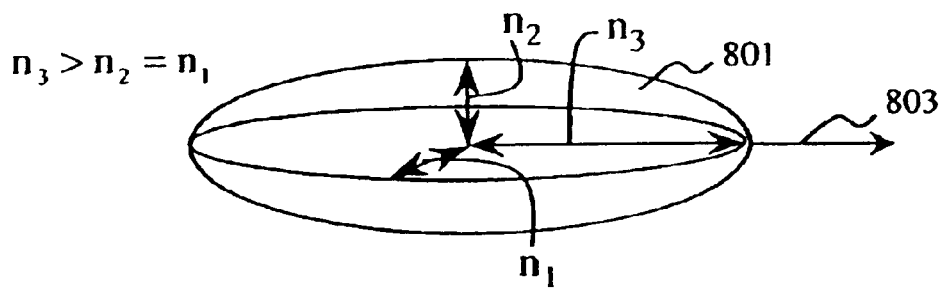
FIG. 8A shows a positively birefringent ellipsoid of index representing the constituent material for the anisotropic layer disposed on the base film.
Figure 8B:
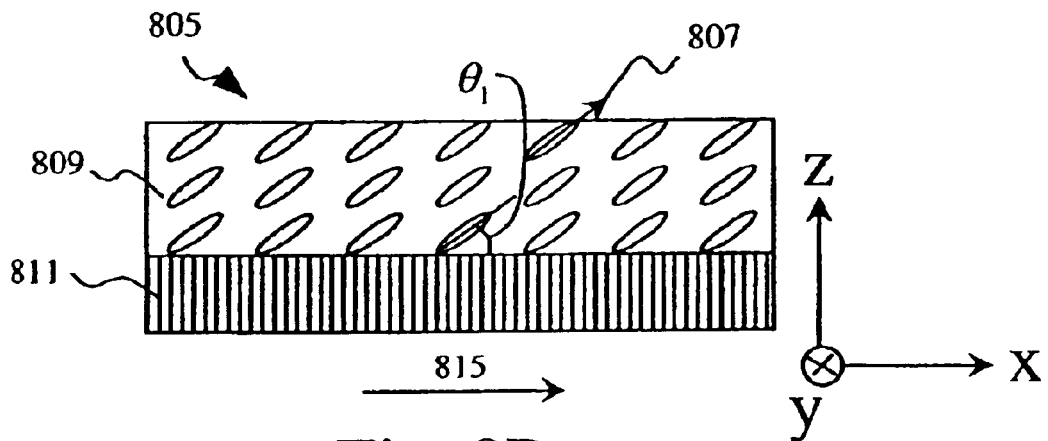
FIG. 8B shows a film with a uniformly tilted optic axis.
Figure 8C:
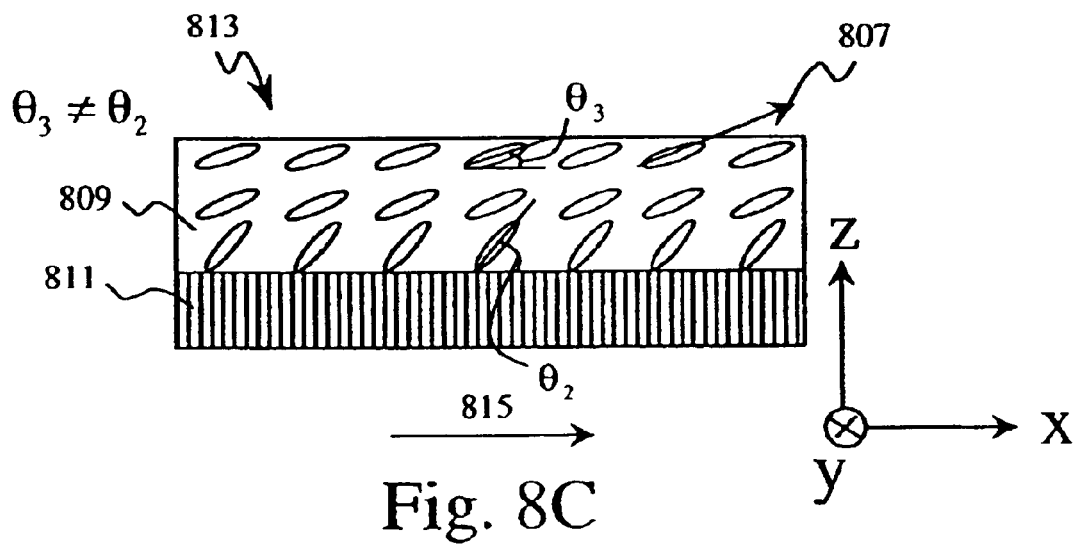
FIG. 8C is a case where optic axis direction varies in the thickness direction.

The compensation films 805, 813 for the homogeneous type IPS liquid crystal display in accordance with this invention has one optically anisotropic layer 809 disposed on the base film 811 as depicted in FIGS. 8B and 8C. The optical property of the base film 811 is preferably close to that of a uniaxial positive C-film as shown in FIG. 5B. Biaxial films with its slow axis normal to the film, such as the one shown in FIG. 5C can also be used as the base film 811. The out of plane phase retardation $R_{base}$ of the base film 811, with its thickness $d_{base}$ is given by $R_{base}=d_{base}(n_e^{base}-n_o^{base})$ for uniaxial case (corresponding to FIG. 5B) and $$R_{base} = d_{base}\left(n_{z0}^{base} - \frac{n_{xo}^{base} + n_{yo}^{base}}{2}\right)$$

for biaxial case (corresponding to FIG. 5C). Here, $n_o^{base}$ and $n_e^{base}$ are indices of refraction for ordinary and extraordinary rays of the uniaxial base film, respectively. $n_{x0}^{base}$, $n_{y0}^{base}$ and $n_{z0}^{base}$ are three principal indices of refraction of the biaxial base film in the configuration shown in FIGS. 5C and 5D. The preferable value for $R_{base}$ is given by 60 nm<$R_{base}$<100 nm or more preferably 70 nm<$R_{base}$<90 nm.

The anisotropic layer 809 contains a material with an optical property of uniaxial or biaxial nature. The direction of the optic axis of the material is fixed in one azimuthal angle on the film plane. The azimuthal angle can be fixed by an alignment layer (not shown) between the base film 811 and a layer of the optically anisotropic material 809. In the case of a material with the uniaxial nature, it has two equivalent indices $n_o^{ans}=n_1=n_2$ that are smaller than $n_e^{ans}=n_3$ represented by index of ellipsoid 801 as shown in FIG. 8A, where $n_o^{ans}$ and $n_e^{ans}$ are ordinary and extraordinary indices of refraction for constituent material of the anisotropic layer, respectively. In the uniaxial case, the direction of the optic axis 803 corresponds to the maximum refraction index, $n_3$ and the material is positively birefringent. In the biaxial case, all of indices of refraction assume different values and the optic axis does not necessarily lie on the direction of the largest index of refraction.

Compensation films 805, 813 according to the invention are shown in FIGS. 8B and 8C. A positively birefringent material is deposited on the base film 811. In FIG. 8B, the optic axis of the material 807 uniformly tilts with an angle $\theta_1$ throughout the film thickness whereas the tilt angle changes $\theta_2 \neq \theta_3$ in FIG. 8C. There are two possible cases; increasing ($\theta_2<\theta_3$) or decreasing ($\theta_2>\theta_3$) tilt. The azimuthal direction of the film 815 is defined by the projection of the optic axis tilt direction 807 onto the plane of the base film 811 which corresponds to the x-y plane in FIGS. 8B and 8C. For the uniform case, the angle of tilt $\theta_1$ is between $0°<\theta_1 \leq 10°$ or more preferably $2° \leq \theta_1 \leq 8°$. When the tilt is varying, there are two cases; 1) a decreasing tilt ($\theta_2>\theta_3$) and an increasing tilt ($\theta_3>\theta_2$). In the decreasing case, $\theta_2$ and $\theta_3$ are between $10° \leq \theta_2 \leq 20°$, $0° \leq \theta_3 \leq 10°$, or more preferably $10° \leq \theta_2 \leq 15°$, $0° \leq \theta_3 \leq 5°$. The increasing case is just opposite, namely, $\theta_2$ and $\theta_3$ are between $0° \leq \theta_2 \leq 10°$, $10° \leq \theta_3 \leq 20°$, or more preferably, $0° \leq \theta_2 \leq 5°$, $10° \leq \theta_3 \leq 15°$. The product $d_{ans}(n_e^{ans}-n_o^{ans})$ is preferably in the range given by 120 nm<$d_{ans}(n_e^{ans}-n_o^{ans})$<150 nm or more preferably 130 nm<$d_{ans}(n_e^{ans}-n_o^{ans})$<145 nm, where $d_{ans}$ is the thickness of anisotropic layer 809.

Figure 9A:
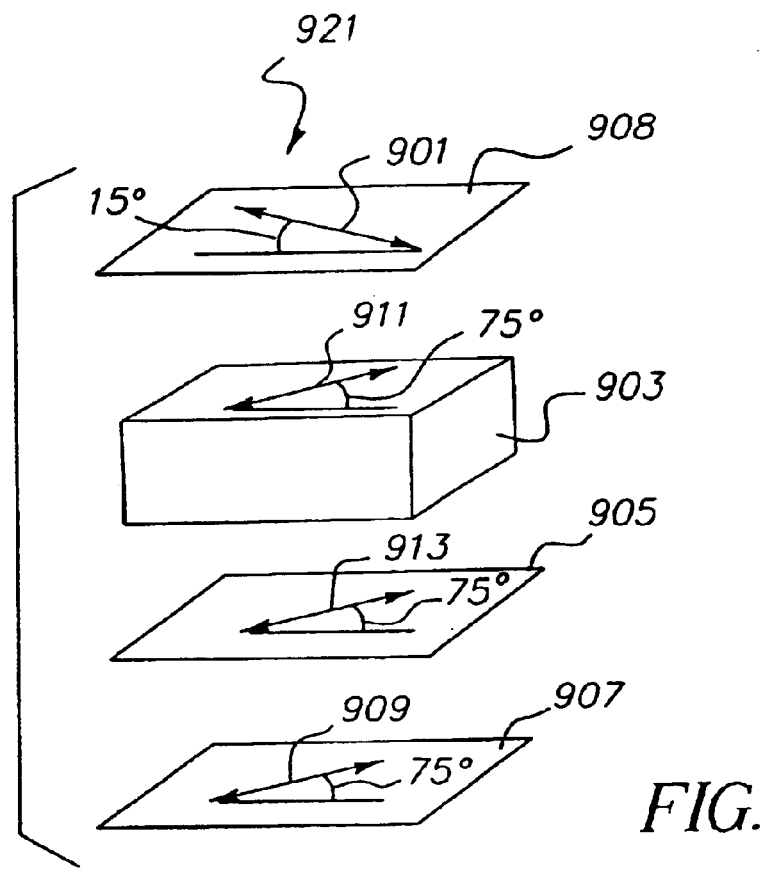
FIG. 9A is a schematic of the display according to the invention.
Figure 9B:
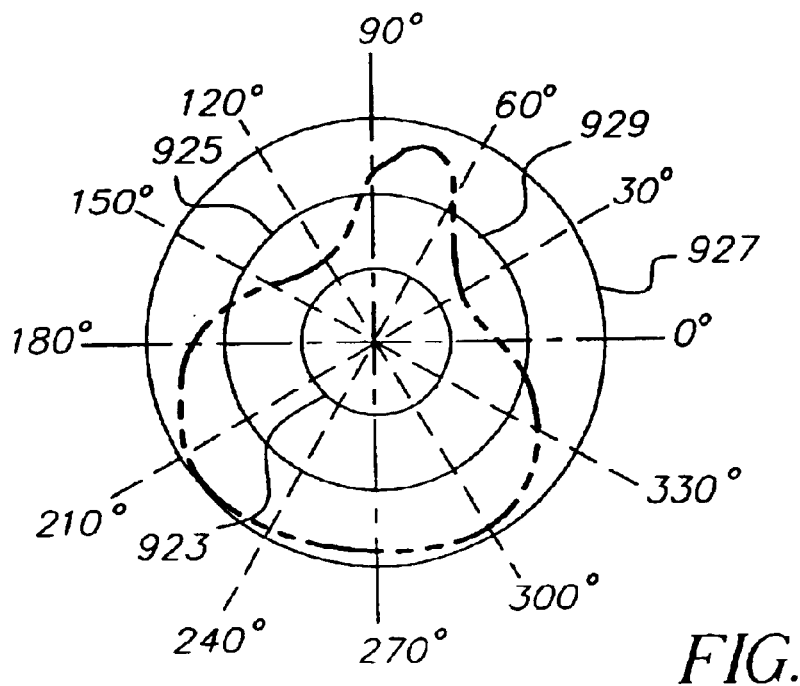
FIG. 9B is the plot of the contrast ratio against azimuthal viewing angle β at polar viewing angle α=30°.

FIG. 9A shows an example of the homogeneous type IPS mode liquid crystal display 921 according to the invention. Transmission axes of a pair of polarizers 907, 908 are crossed. The IPS mode liquid crystal cell 903 is placed between the compensation film 905 and a polarizer 908. The axis of transmission 909 of the other polarizer 907 is parallel to the azimuthal direction of the compensation film 913. It is also parallel to the azimuthal direction of liquid crystal optic axis 911 of the homogeneous type IPS mode liquid crystal cell 903 in the OFF state. The transmission axes 901, 909 of the pair of polarizers, 908, 907 are crossed. The compensation film 905 has a structure of film 813 as shown in FIG. 8C with the base film with positive C-film optical property. The resulting VAC is shown in FIG. 9B. Concentric circles 923, 925, 927 indicate the contrast ratio of 300, 600 and 900, respectively. The line 929 indicates the change in the contrast ratio for various azimuthal viewing angle β when the display is viewed at 30° from the display normal; α=30°. Comparing to the VAC of the prior art display 717 shown in FIG. 7C, an improvement in contrast ratio of the display according to the invention has been demonstrated by VAC in FIG. 9B. Displays, 717 and 921 have the same tilt angle φ=4° of liquid crystal optic axis 304. For example, the contrast ratio for β=150° and 330° has been increased to 550 or larger from less than 300. It should be understood that the compensation film 905 can also take a structure of film 805 as shown in FIG. 8B.

According to this invention, the twist type IPS mode liquid crystal display is compensated by the combination of a compensation film containing a positively birefringent material oriented with its optic axis tilted in a plane perpendicular to the liquid crystal cell plane and a twist-structured film. The twist-structured film comprises a negatively birefringent material that exhibits twist structure in the direction of optic axis. The compensation film contains a positively birefringent material oriented with its optic axis tilted in a plane perpendicular to the liquid crystal cell plane.

According to this invention, the twist type IPS mode liquid crystal display is also compensated by a film comprising a positively birefringent material with its optic axis tilted in the plane perpendicular to the liquid crystal cell plane and a negatively birefringent material with its optic axis twisted across the thickness direction.

Figure 10A:
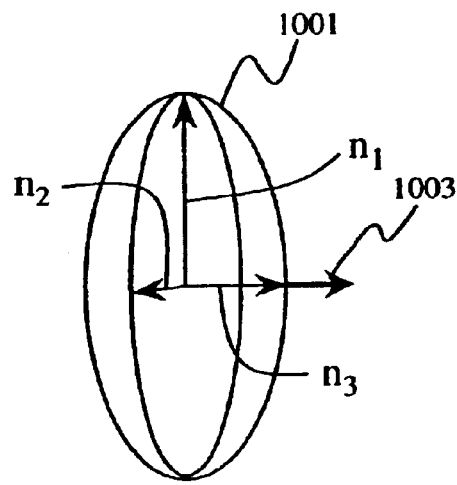
FIG. 10A shows a negatively birefringent ellipsoid of index representing the constituent material for the anisotropic layer disposed on the base film.
Figure 10B:
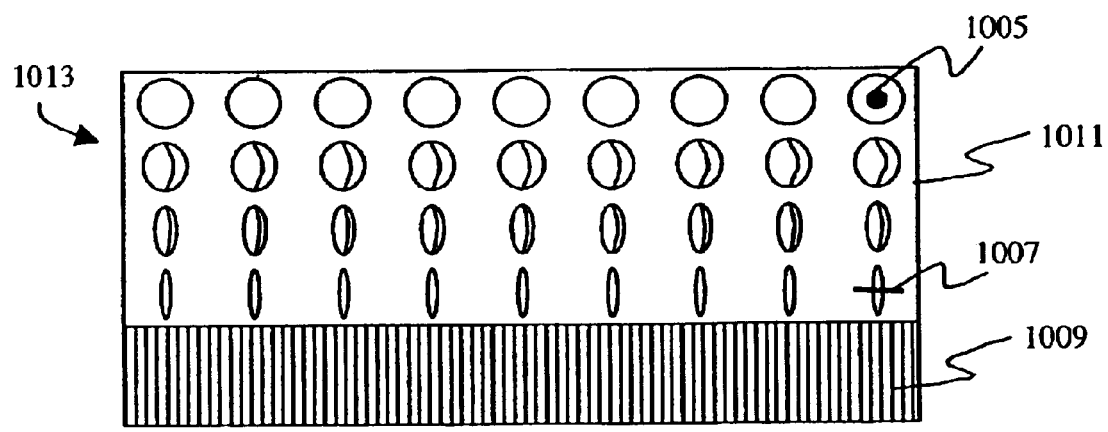
FIG. 10B shows a structure of twist-structured film.

The use of negatively birefringent twist-structured film for Twist Nematic mode liquid crystal display is disclosed in U.S. Pat. No. 6,184,400. FIG. 10A shows an index ellipsoid 1001 for negatively birefringent materials. The optic axis lies in the direction indicated by an arrow 1003. The refraction indices satisfy the relation $n_3<n_1 \approx n_2$. Here we have $n_e^{neg}=n_3$ and $n_o^{neg}=n_1=n_2$ (i.e., $n_e^{neg}<n_o^{neg}$) for uniaxial case. The ordinary and extraordinary refraction indices of the negatively birefringent material are denoted by $n_o^{neg}$ and $n_e^{neg}$. An example of the twist structured film 1013 is shown in FIG. 10B. The twist-structured layer 1101 is deposited on the base film 1009. The optical property of the base film 1009 is preferably isotropic. As is well known in the art, an isotropic material has three equal principal refractive indices, i.e., $n_1=n_2=n_3$. Films with weakly uniaxial or biaxial character also can be used. Inside the layer 1011, the optic axis 1005, 1007 of negatively birefringent film rotates 90° in the plane of the film. The handedness of the rotation is best to be taken as the opposite to that of the twist type IPS mode liquid crystal cell. In the example in FIG. 10B, the rotation inside the layer 1011 is night handed. The thickness of the film $d_{neg}$ satisfies $0.8R_{cell}<d_{neg}(n_o^{neg}-n_e^{neg})<1.2R_{cell}$ or more preferably $0.9R_{cell}<d_{neg}(n_o^{neg}-n_e^{neg})<1.1R_{cell}$ where $R_{cell}$ is a phase retardation of the twist type IPS IPS mode liquid crystal cell. It is given by $R_{cell}=d_{cell}(n_e^{1c}-n_o^{1c})$ with $d_{cell}$ being a thickness of the twist type IPS mode liquid crystal cell. $n_o^{1c}$ and $n_e^{1c}$ are indices of refraction of liquid crystal for ordinary and extraordinary ray, respectively.

The compensation film for the twist type IPS mode liquid crystal display has the structure of the film 805 shown in FIG. 8B or the film 813 shown in FIG. 8C. With the structure of uniform tilt as in FIG. 8B, $\theta_1$ is preferably in the range of $0°<\theta_1<6°$ or more preferably $0°<\theta_1<4°$. When the tilt varies such as the case in FIG. 8C, two cases are possible: 1) decreasing tilt $\theta_2>\theta_3$, and 2) increasing tilt $\theta_2<\theta_3$. In the first case, the preferable values are $0°<\theta_2\leq8°$, $0°\leq\theta_3\leq4°$ or more preferably $0°<\theta_2\leq4°$, $0°\leq\theta_3\leq2°$. For increasing case, it is just opposite of the decreasing case and preferable values are $0\leq<\theta_2\leq4°$, $0°<\theta_3\leq8°$ or more preferably $0°\leq\theta_2\leq2°$, $0°<\theta_3\leq4°$.

Figure 11A:
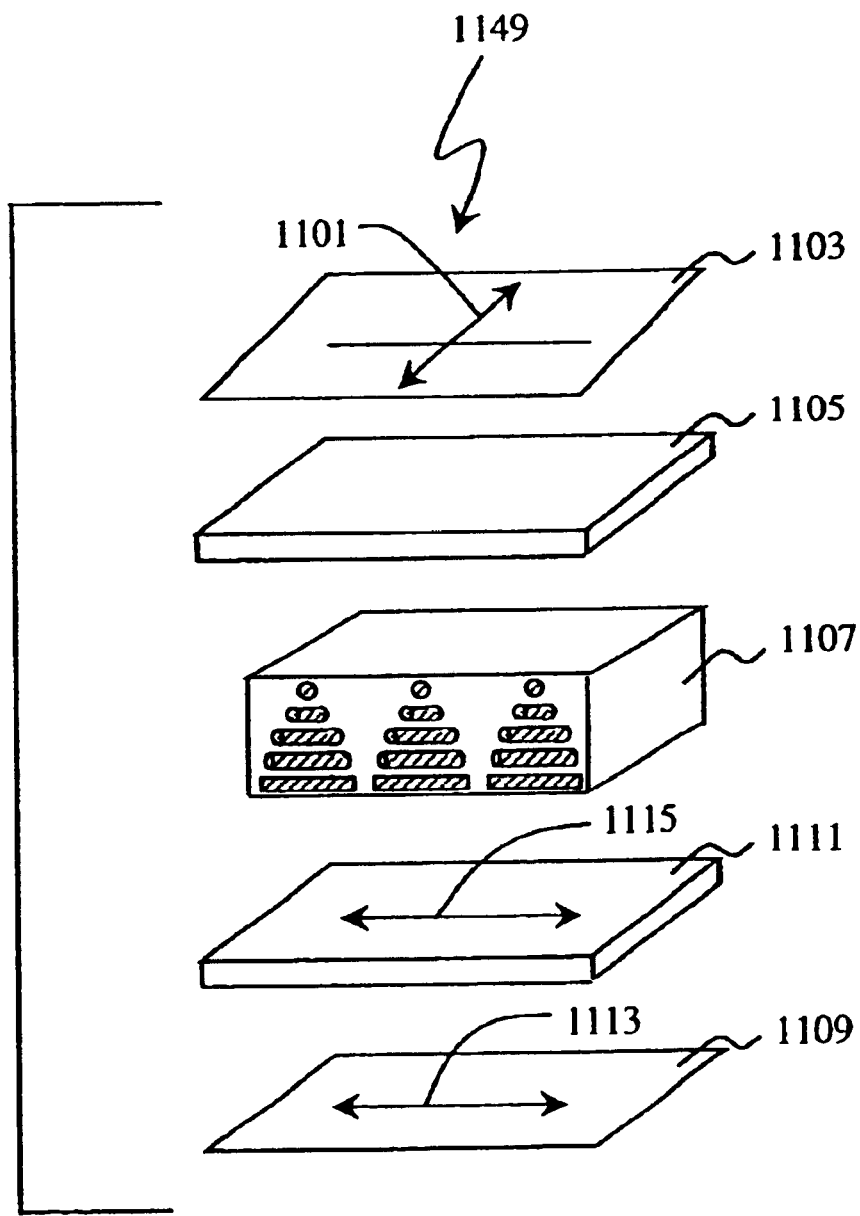
FIG. 11A is a schematic of display according to the invention.

FIG. 11A is one of the embodiments of display 1149 according to the current invention. A twist type IPS mode liquid crystal cell 1107 is sandwiched between the compensation film 1111 and twist-structured film 1105. The pair of polarizers 1103 and 1109 are used and their transmission axes 1101 and 1113 are crossed. The azimuthal direction 1115 of the compensation film 1111 is parallel to the transmission axis 1113 of the adjacent polarizer 1109.

Figure 11B:
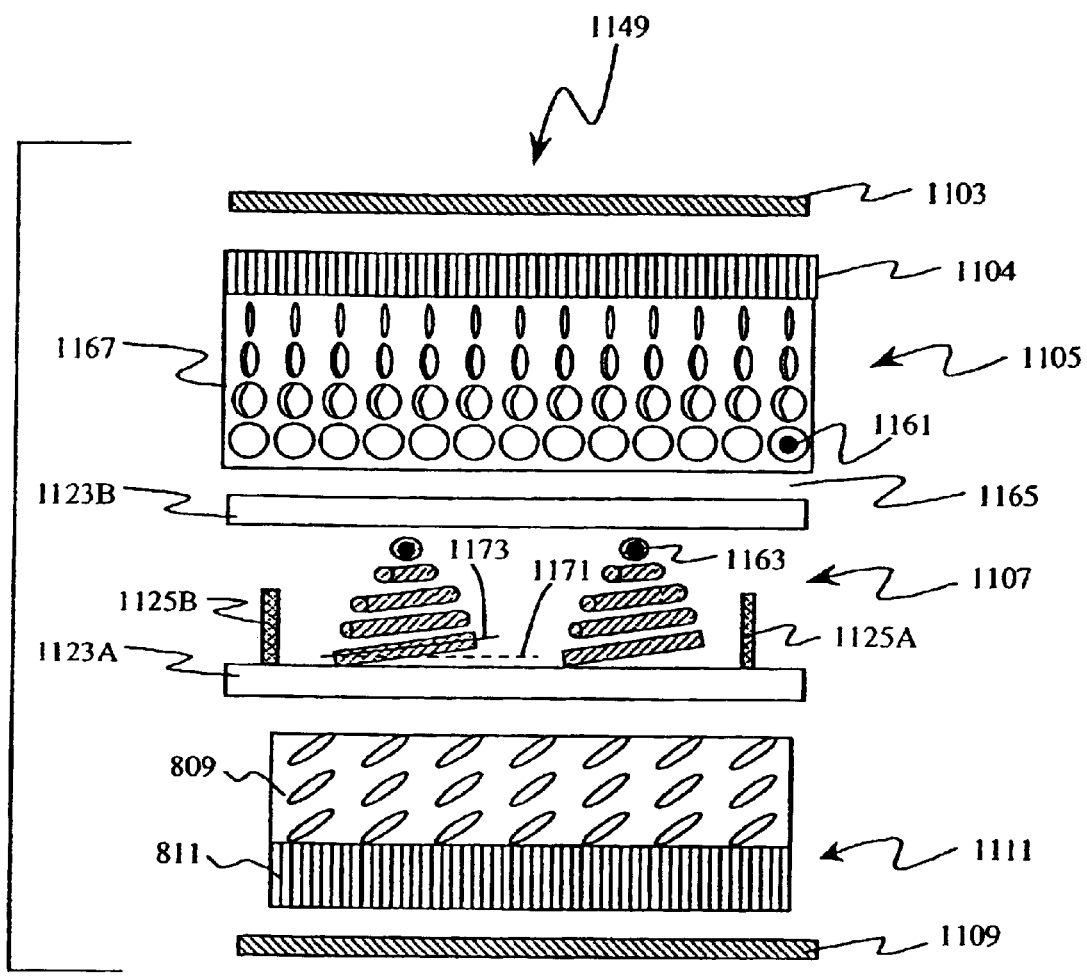
FIG. 11B is a cross sectional view corresponding to the display in FIG. 11A.

FIG. 11B is the cross sectional view of the display 1149 in FIG. 11A in the OFF state. The twist type IPS mode liquid crystal cell 1107 has the bottom 1123A and the top 1123B glass plates and a set of electrodes 1125A, 1125B for an application of in-plane field. At the bottom of the cell, the azimuthal direction 1171 of liquid crystal optic axis 1173 is parallel to the transmission axis of the polarizer 1109. At the top of the cell, the azimuthal direction 1163 of the liquid crystal optic axis (not shown) is parallel to the transmission axis of the polarizer 1103 at the top. Inside the twist-structured layer 1167 deposited on the base layer 1104, the negatively birefringent material takes twist structure. In the example shown in FIG. 11B, the handedness of liquid crystal optic taxis twist inside the twist type IPS mode liquid crystal cell 1107 is right. Correspondingly, the twist-structured layer 1167 has left handed twist structure. The optic axis 1161 of the twist-structured layer 1167 and azimuthal direction 1163 of liquid crystal optic axis at their bordering interface 1165 are parallel to each other.

Figure 11C:
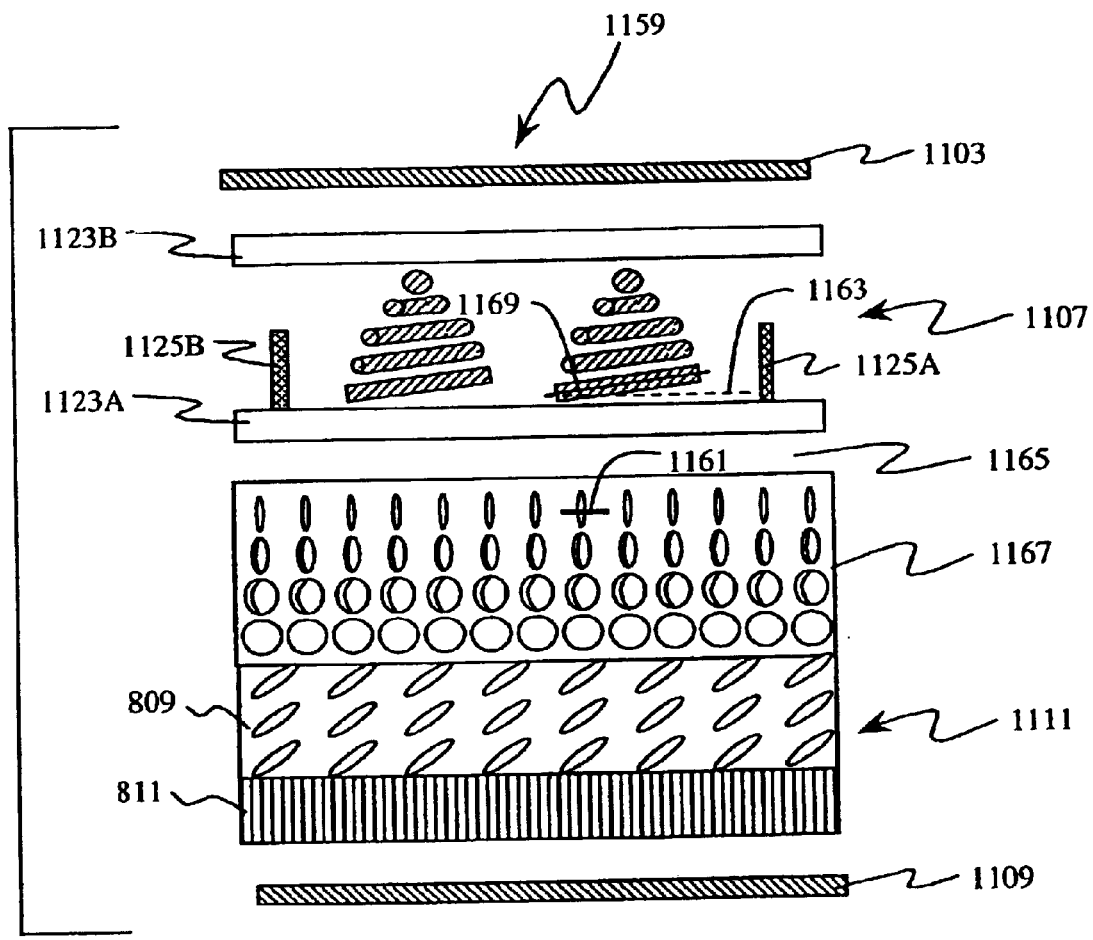
FIG. 11C is a cross sectional view of another display configuration where twist-structured layer is disposed on the positively birefringent material with its optic axis tilted in the plane perpendicular to the liquid crystal cell plane.

FIG. 11C is a cross sectional view of the display 1159 with a film comprising a positively birefringent material with its optic axis tilted in the plane perpendicular to the liquid crystal cell plane and a negatively birefringent material with its optic axis twisted across the thickness direction. In this case, the film for compensating the cell 1107 has a structure in which the twist-structured layer 1167 is disposed on the compensation film 1111. The compensation film 1111 can have the structure either the one given in FIG. 8B (805) or in FIG. 8C (813). As it is the case in the display in FIGS. 11A and 11B, the optic axis 1161 of the twist-structured layer 1167 and the azimuthal direction 1163 of liquid crystal optic axis 1169 at their bordering interface 1165 are parallel to each other.

Figure 6A:
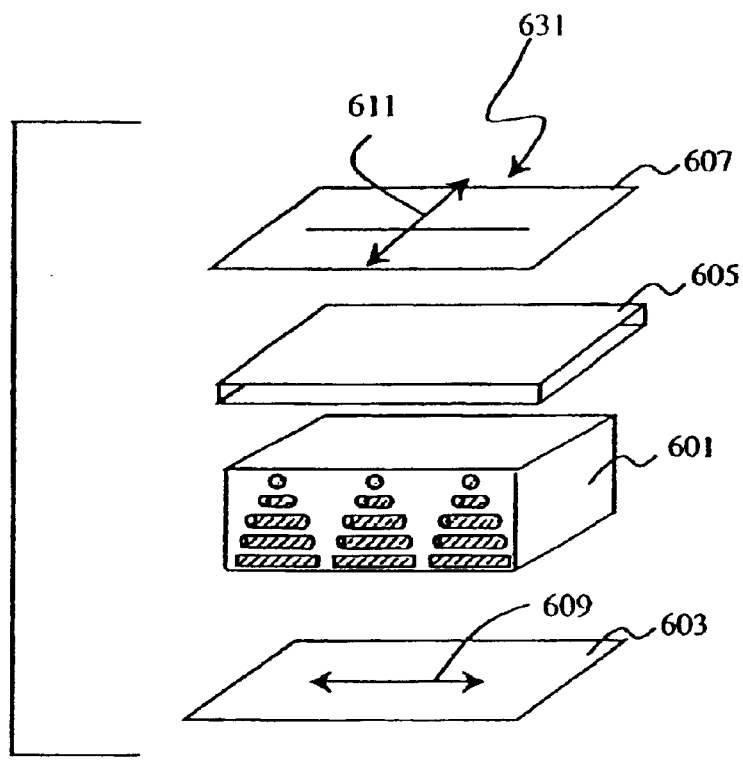
FIG. 6A is a prior art display using a twist type IPS mode liquid crystal cell.
Figure 6B:
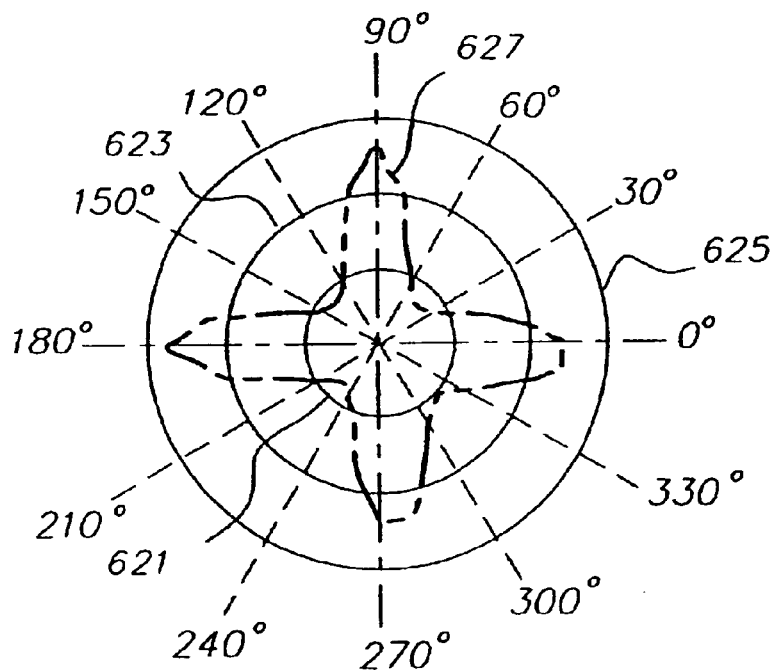
FIG. 6B is the plot of the contrast ratio against azimuthal viewing angle β at polar viewing angle α=30°.
Figure 11D:
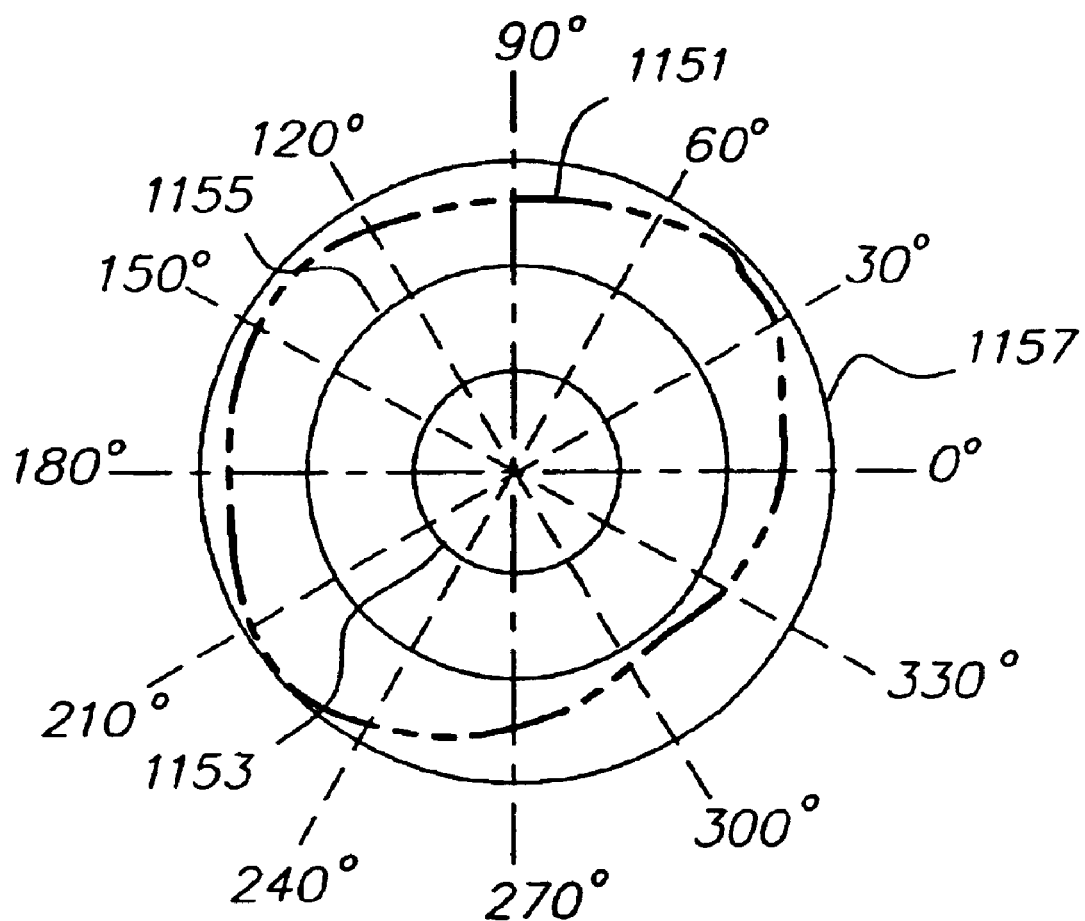
FIG. 11D is a plot of the contrast ratio against azimuthal viewing angle β at polar viewing angle α=30° for the display shown in FIGS. 11A, 11B and 11C.

FIG. 11D is a VAC of the twist type IPS mode liquid crystal displays 1149 shown in FIGS. 11A and 11B. In this example, the structure of the compensation film 1111 is that of 805 shown in FIG. 8B. The line 1151 showing the VAC in terms of change in the contrast ratio at polar viewing angle $\alpha=30°$ is plotted against $0\leq\beta<360°$. Circles, 1153, 1155, 1157 correspond to the contrast ratio of 400, 800 and 1200, respectively. In comparison to the VAC shown in FIG. 6B of the prior art twist type IPS mode liquid crystal display 631 in FIG. 6A, the current invention has made improvement. For example, the contrast ratio at $\beta=45°$, 135°, 225° and 315° has increased from 400 or less to more than 800. Display 1159 shows equivalent VAC of the display 1149.

The optically anisotropic layer 809 shown in FIGS. 8B and 8C can be produced by various methods. One example is a photo-alignment method as was suggested by Schadt et al. (Japanese Journal of Applied Physics, Part 2 (Letters) v 34 n 6 1995 pp.L764–767). For example, a thin alignment layer is coated on the base film followed by a radiation of polarized light. A liquid crystal monomer is then coated on the alignment layer and polymerized by a further radiation. The tilt of optic axis in the anisotropic layer depends on the radiation angle, the thickness of anisotropic layers as well as properties of materials. Also, a desired alignment can be obtained by mechanically rubbing surface of the alignment layer. Other known methods employ shear forces orientations and the effect of an electric or a magnetic field. The same alignment methods can be applied to prepare twist-structured film consisting of negatively birefringent film so as to obtain uniform direction in the optic axis 1007 at the bottom of the layer 1011. The twist-structure in the layer thickness direction with desired handedness can be obtained, for example, by a method described in U.S. Pat. No. 6,245,398.

There are many variations in electrode configuration in the IPS mode liquid crystal display such as the one taught by U.S. Pat. No. 6,362,032. The current invention is equally applicable to IPS mode liquid crystal displays with all the variations in electrode configurations if the optic axis remains sufficiently paralell (within $\pm10°$) to the liquid crystal cell plane in one of the ON or OFF state.

The invention may be used in conjunction with electronic liquid crystal display devices. The energy required to achieve this control is generally much less than that required for the luminescent materials used in other display types such as cathode ray tubes. Accordingly, liquid crystal technology is used for a number of applications, including but not limited to digital watches, calculators, portable computers, electronic games for which light weight, low power consumption and long operating life are important features.

In the following examples, a liquid crystal ZLI-4621 from Merck Inc. is used.

EXAMPLE 1

The Homogeneous Type IPS Mode Liquid Crystal Display 921 as Shown in FIG. 9A.

The cell thickness is 3.47 microns, which makes $R_{cell}=$ 342 nm for light with wavelength at 550 nm. The compensation film 905 has a structure of the film 813 shown in FIG. 8C with $\theta_2=11°$ and $\theta_3=2°$. The anisotropic layer 809 has a product $d_{ans}$ ($n_e^{ans}-n_o^{ans}$)=140 nm. The base film 811 has positive C-film optical properties with $R_{base}=80$ nm. The Off state corresponds to the applied voltage 0V while in the On state the applied voltage is 10 V. The distance between the two adjacent electrodes is 15 microns and the electrode width is 7 microns. The tilt $\phi$ of liquid crystal optic axis at the cell surface 310 is 4°. The display configuration is shown in FIG. 9A and its VAC is shown in FIG. 9B.

Figure 7C:
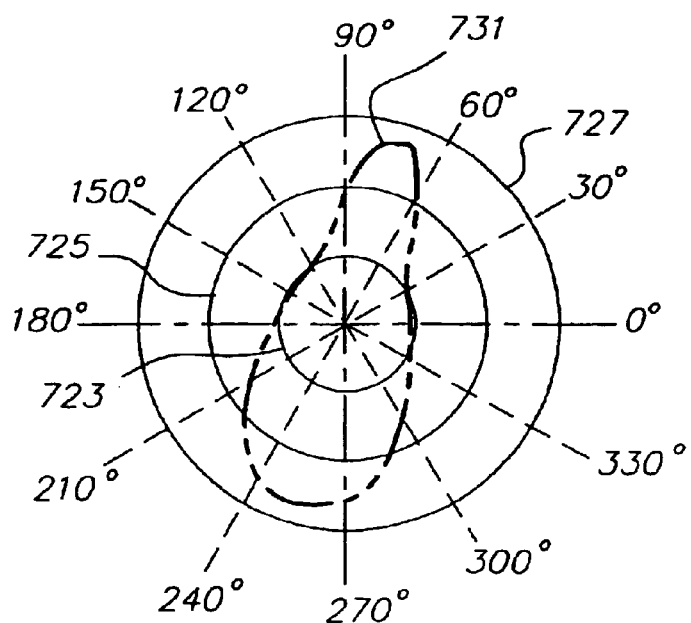

The display 921 of the current invention has better VAC (shown in FIG. 9B) than the one of the prior art 717 shown in FIG. 7C. The contrast ratio increased for wide range of azimuthal viewing angle $\beta$ in the display 921 from the prior art display 717 shown in FIG. 7A.

EXAMPLE 2

The Twist Type IPS Mode Liquid Crystal Displays 1149 as Shown in FIGS. 11A and 11B.

The thickness of the cell is 4.96 microns. The distance between the two adjacent electrodes is 15 microns and the electrode width is 7 microns. The liquid crystal optic axis in the twist type IPS mode liquid crystal cell twist 90° and the twist is right-handed. The compensation film 1111 has a structure of the film 805 as shown in FIG. 8B with $\theta_1=2°$. The phase retardation $R_{base}$ of the base film 811 of the compensation film is 80 nm. The anisotropic layer 809 has a product $d_{ans}(n_e^{ans}-n_o^{ans})=135$ nm. The base film 1104 of the twist-structured film 1105 is assumed to be optically isotropic. The optic axis of negatively birefringent material inside the twist-structured layer 1167 twist 90° and the twist is left-handed. The equality $d_{neg}(n_o^{neg}-n_e^{neg})=d_{cell}(n_e^{1c}-n_o^{1c})$ is assumed. The Off voltage is 0 V and the ON voltage is 13 V. The tilt φ of the liquid crystal optic axis is 3°. FIG. 11D shows the VAC of the twist type IPS mode liquid crystal display 1149 as shown in FIGS. 11A and 11B. The display 1149 according to the current invention have superior VAC in comparison to that of the prior art display 631 shown in FIG. 6A. The contrast ratio has increased for a wide range of azimuthal viewing angle β in the display 1149 from the prior art display 631. Especially, increase at angles θ=45°, 135°, 225° and 315° is significant.

Embodiments of the invention can provide superior means of prevention of light leakage in the OFF state of IPS mode liquid crystal displays; can provide wide-viewing angle LCD's using the IPS modes by combining the IPS mode liquid crystal cell and compensation films; and can provide an electronic device containing the display of the invention as well as methods for preparing the display of the invention. Compensation films containing a positively birefringent material oriented with its optic axis tilted in a plane perpendicular to the liquid crystal cell plane are usable in combination with homogeneous and twist type IPS mode liquid crystal cells.

The entire contents of the patents and other publications referred to in this specification are incorporated herein by reference.

PARTS LIST 101 liquid crystal display
103 display normal direction
105 azimuthal reference direction of the liquid crystal display
107 liquid crystal display surface
108 projection of the viewing direction on the display surface
109 vector specifying the viewing direction
201 liquid crystal optic axis
202 arrow indicating the direction of in-plane electric field
203 transmission axis of polarizer
204 transmission axis of polarizer
205A, 205B pair of electrodes for in-plane electric field
207 voltage source
209 switch
301 homogeneous type IPS mode liquid crystal display
302 polarizer
303 polarizer
304 liquid crystal optic axis
305 arrow indicating the direction of in-plane electric field
307A, 307B pair of electrodes for in-plane electric field
309, 309B the bottom and the top glass plates
310 liquid crystal cell plane
311 azimuthal direction of the liquid crystal optic axis 304
401A, 401B the bottom and the top glass plates
402 polarizer
403 polarizer
405 liquid crystal optic axis
406 azimuthal direction of liquid crystal optic axis 405
407 arrow indicating the thickness direction
411 twist type IPS mode liquid crystal display
413A, 413B pair of electrodes for in-plane electric field
441 liquid crystal cell plane
501 plane of the phase retardation film
503 optic axis
505 optic axis
509 slow axis
511 slow axis
601 twist type IPS mode liquid crystal cell
603 polarizer
605 twist-structured film
607 polarizer
609 transmission axis of polarizer 603
611 transmission axis of polarizer 607
621 circle indicating the contrast ratio 400
623 circle indicating the contrast ratio 800
625 circle indicating the contrast ratio 1200
627 line showing the change in the contrast ratio for various azimuthal viewing angles β
631 twist type IPS mode liquid crystal display
701 biaxial compensation film
703 homogeneous type IPS mode liquid crystal cell
705 polarizer
707 polarizer
709 slow axis of the biaxial compensation film
711 transmission axis of the polarizer 705
713 azimuthal direction of liquid crystal optic axis in the OFF state of homogeneous type IPS mode liquid crystal cell 703
715 transmission axis of the polarizer 707
717 homogeneous type IPS mode liquid crystal display
721 line showing the change in the contrast ratio for various azimuthal viewing angles β
723 circle indicating the contrast ratio of 300
725 circle indicating the contrast ratio of 600
727 circle indicating the contrast ratio of 900
731 line showing the change in the contrast ratio for various azimuthal viewing angles β
801 ellipsoid of index representing the positively birefringent material
803 the direction of optic axis
805 compensation film with uniform tilt in optic axis
807 optic axis
809 optically anisotropic layer
811 base film
813 compensation film with varying optic axis direction
815 azimuthal direction of compensation film
901 transmission axis of the polarizer 908
903 homogeneous type IPS mode liquid crystal cell
905 compensation film
907 polarizer
908 polarizer
909 transmission axis of polarizer 907
911 azimuthal direction of liquid crystal optic axis in the OFF state of homogeneous type IPS mode liquid crystal cell
913 the azimuthal direction of compensation film
921 homogeneous type IPS mode liquid crystal display according to the invention
923 circle indicating the contrast ratio of 300
925 circle indicating the contrast ratio of 600
927 circle indicating the contrast ratio of 900
929 line showing the change in the contrast ratio for various azimuthal viewing angles β
1001 ellipsoid of index representing the negatively birefringent material 1003 arrow indicating the direction of optic axis
1005 optic axis at the top of layer 1011
1007 optic axis at the bottom of the layer 1011
1009 base film
1011 twist-structured layer
1013 twist-structured film
1101 transmission axis of the polarizer 1103
1103 polarizer
1104 base film
1105 twist-structured film
1107 twist type IPS mode liquid crystal cell
1109 polarizer
1111 compensation film
1113 transmission axis of polarizer 1109
1115 azimuthal direction of the compensation film 1111
1123A, 1123B a pair of the bottom and the top glass plates
1125A, 1125B a pair of electrodes for in-plane electric field
1149 twist type IPS mode liquid crystal display according to the invention
1151 line showing the change in the contrast ratio for various azimuthal viewing angles β
1153 circle indicating the contrast ratio of 400
1155 circle indicating the contrast ratio of 800
1157 circle indicating the contrast ratio of 1200
1159 twist type IPS mode liquid crystal display according to the invention
1161 optic axis of negatively birefringent material at the interface 1165
1163 azimuthal direction of liquid crystal optic axis 1169
1165 interface between the twist structured film 1105 and the twist type IPS mode liquid crystal cell 1107
1167 twist-structured layer
1169 liquid crystal optic axis
1171 azimuthal direction of liquid crystal optic axis 1173
1173 liquid crystal optic axis

What is claimed is:

1. A display comprising an in-plane switching (IPS) mode liquid crystal cell, a polarizer, and a compensation film, the compensation film containing a positively birefringent material oriented with its optic axis tilted in a plane perpendicular to the liquid crystal cell plane, wherein the optic axis is,
   (I) in the case of homogeneous type IPS cell, tilted as follows:
       (a) in the case of a uniformly tilted compensation film the optic axis is tilted at an angle so that $0<\theta_1 \leq 10°$;
       (b) in the case of a decreasingly tilted compensation film the optic axis is tilted at an angle so that $10 \leq \theta_2 \leq 20°$ and $0 \leq \theta_3 \leq 10°$;
       (c) in the case of a increasingly tilted compensation film the optic axis is tilted at an angle so that $0 \leq \theta_2 \leq 10°$ and $10 \leq \theta_3 \leq 20°$; and
   (II) in the case of a twist type IPS cell, tilted as follows
       (a) in the case of a uniformly tilted compensation film the optic axis is tilted at an angle so that $0<\theta_1<6°$;
       (b) in the case of a decreasingly tilted compensation film the optic axis is tilted at an angle so that $0<\theta_2 \leq 8°$ and $0 \leq \theta_3 \leq 4°$;
       (c) in the case of a increasingly tilted compensation film the optic axis is tilted at an angle so that $0 \leq \theta_2 \leq 4°$ and $0<\theta_3 \leq 8°$.

2. A display according to claim 1, comprising a pair of polarizers disposed one on each side of the IPS mode liquid crystal cell, the pair of polarizers having their transmission axes crossed.

3. A display according to claim 2 wherein the compensation film is disposed between the IPS mode liquid crystal cell and one of the polarizers.

4. A display according to claim 1 wherein the compensation film is disposed between the IPS mode liquid crystal cell and the polarizer.

5. A display according to claim 1 wherein the positively birefringent material is disposed on a base film that has positive optical anisotropy with an optic or slow axis along the normal of the base film.

6. A display according to claim 5 comprising an alignment layer between the positively birefringent layer and the base film.

7. A display according to claim 1 wherein the tilt in the optic axis of the positively birefringent material layer is uniform cross the thickness of the layer.

8. A display according to claim 1 wherein the tilt in the optic axis of the positively birefringent material layer varies across the thickness of the layer.

9. A display according to claim 1, wherein the IPS mode liquid crystal cell is twisted and an additional optically anisotropic film is disposed between the polarizer and the IPS mode liquid crystal cell said optically anisotropic film containing negatively birefringent material and the optic axis of the said negatively birefringent material exhibit azimuthal rotation with opposite handedness of the liquid crystal optic axis rotation inside the IPS mode liquid crystal cell.

10. A display according to claim 9, wherein the product $d_{neg}(n_o^{neg}-n_e^{neg})$ satisfies $0.8R_{cell}<d_{neg}(n_o^{neg}-n_e^{neg})<1.2R_{cell}$, where $n_o^{neg}$ and $n_e^{neg}$ are the ordinary and extraordinary refraction indices of the negatively birefringent material, respectively, $d_{neg}$ is the thickness of the said optically anisotropic film containing negatively birefringent material, and $R_{cell}$ is the phase retardation of the twist type IPS mode liquid crystal cell.

11. A display according to claim 9, wherein the optic axis of the said optically anisotropic film and the liquid crystal optic axis inside of the IPS mode liquid crystal cell are parallel to each other at their bordering interface.

12. A display according to claim 9, wherein the compensation film containing a positively birefringent material is disposed on a base film that has positive optical anisotropy with an optic or slow axis along the normal of the base film.

13. A method of forming a display of claim 1 wherein the orientation of the optic axis of positively birefringent materials in the compensation film is accomplished using photoalignment.

14. A method of forming a display of claim 1 wherein the orientation of the optic axis of positively birefringent materials in the compensation film is accomplished using mechanical rubbing.

15. A method of forming a display of claim 1 wherein the orientation of the optic axis of positively birefringent materials in the compensation film is accomplished using shear forces.

16. A method of forming a display of claim 1 wherein the orientation of the optic axis of positively birefringent materials in the compensation film is accomplished using electric or magnetic field effects.

* * * * *